United States Patent [19]

Detable et al.

[11] Patent Number: 5,918,350
[45] Date of Patent: *Jul. 6, 1999

[54] CLAMPING COLLAR HAVING AN UNDULATION FORMING A RESERVE OF RESILIENCE

[75] Inventors: Pascal Detable, Gievres; Michel Andre, Romorantin; Henri Viratelle, Mont St Sulpice, all of France

[73] Assignee: Etablissements Caillau, Issy les Moulineaux, France

[*] Notice: This patent issued on a continued prosecution application filed under 37 CFR 1.53(d), and is subject to the twenty year patent term provisions of 35 U.S.C. 154(a)(2).

[21] Appl. No.: 08/590,158
[22] Filed: Jan. 23, 1996

[30] Foreign Application Priority Data

Jan. 25, 1995 [FR] France ................................. 95-00823

[51] Int. Cl.$^6$ ..................................................... F16L 33/02
[52] U.S. Cl. ..................... 24/20 TT; 24/20 EE; 24/20 R; 24/20 CW
[58] Field of Search ............................ 24/20 CW, 20 R, 24/21, 22, 23 R, 23 EE, 20 TT, 20 EE, 20 S

[56] References Cited

U.S. PATENT DOCUMENTS

| 4,742,600 | 5/1988 | Calmettes et al. ................ 24/20 EE X |
| 4,890,360 | 1/1990 | Calmettes et al. ............... 24/20 CW X |
| 4,907,319 | 3/1990 | Calmettes et al. ............... 24/20 CW X |
| 4,987,652 | 1/1991 | Spaulding ........................ 24/20 EE X |
| 5,208,949 | 5/1993 | Calmettes et al. ....................... 24/20 R |
| 5,353,478 | 10/1994 | Spors ....................................... 24/20 R |
| 5,430,912 | 7/1995 | Renzo et al. ....................... 24/20 EE X |
| 5,530,996 | 7/1996 | Calmettes et al. ....................... 24/20 R |

FOREIGN PATENT DOCUMENTS

| 236217A1 | 9/1987 | European Pat. Off. . |
| 491610A1 | 6/1992 | European Pat. Off. . |
| 545629A3 | 6/1993 | European Pat. Off. . |

*Primary Examiner*—Peter M. Cuomo
*Assistant Examiner*—Stephen Vu
*Attorney, Agent, or Firm*—Marshall & Melhorn

[57] ABSTRACT

A clamping collar constituted by a rolled-up first metal strip portion referred to as an "inner" portion and having two radial folds in the vicinity of one of its ends forming a "lug", and by a second strip portion referred to as an "outer" portion, which is fixed at its first end to the outside face of the inner portion, which has an undulation forming a reserve of resilience, which is provided at its second end with a hook suitable for engaging behind the lug while the collar is being clamped, and which includes an "intermediate" part situated between the undulation and the hook and extending substantially along the periphery of the inner portion which thus has a covered zone covered by said intermediate part. The collar includes first and second abutment means formed respectively on the intermediate part of the outer portion and on the covered zone of the inner portion and suitable for co-operating with each other to set a limit on use of the reserve of resilience.

16 Claims, 2 Drawing Sheets

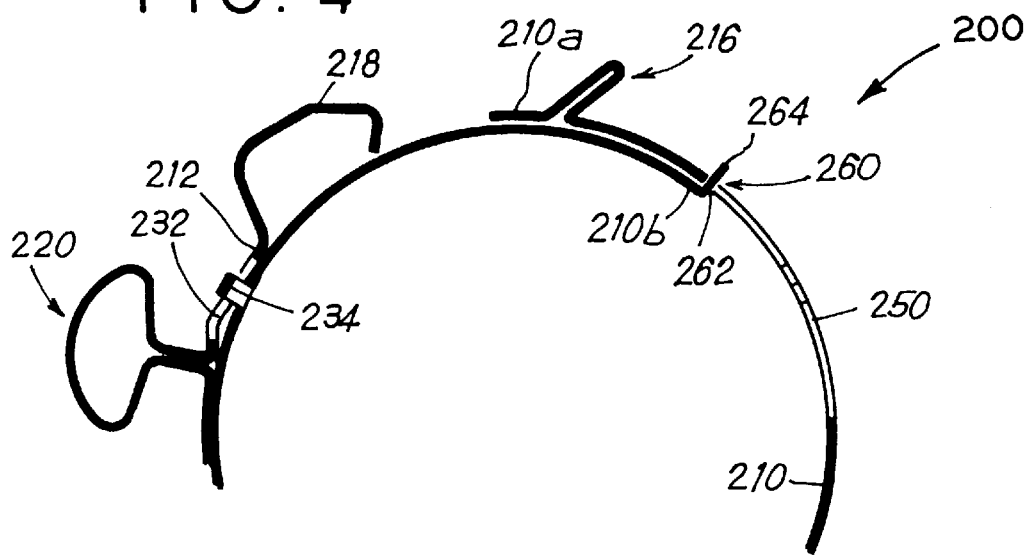
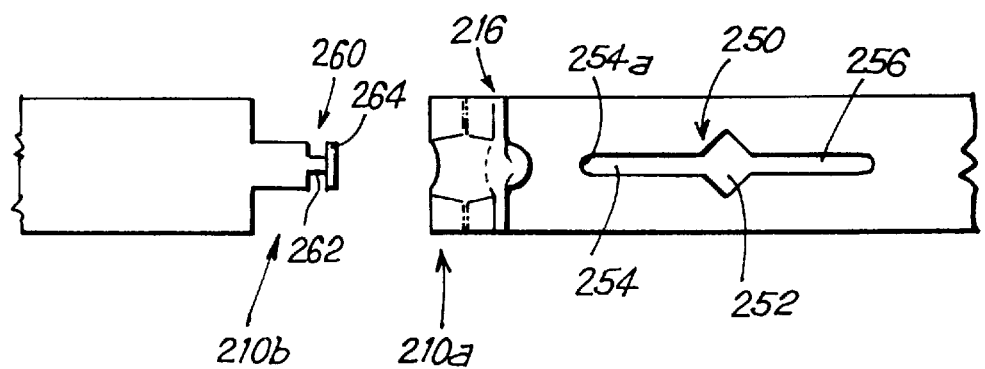

CLAMPING COLLAR HAVING AN UNDULATION FORMING A RESERVE OF RESILIENCE

BACKGROUND OF THE INVENTION

It is known, in particular from the French patent published under the No. 2 470 275 in the name of the Applicant, that a clamping collar can be provided with an undulation that provides a reserve of resilience.

French patent application No. 93 06 046 filed by the Applicant on May 19, 1993 proposes an improvement to a collar of that type.

That application discloses a clamping collar constituted by a rolled-up first metal strip portion referred to as an "inner" portion and having two radial folds in the vicinity of one of its ends forming a "lug", and by a second strip portion referred to as an "outer" portion, which is fixed at its first end to the outside face of the inner portion, which has an undulation forming a reserve of resilience, which is provided at its second end with a hook suitable for engaging behind the lug while the collar is being clamped, and which includes an "intermediate" part situated between the undulation and the hook and extending substantially along the periphery of the inner portion which thus has, in the vicinity of the other one of its ends, a covered zone covered by said intermediate part.

It is known that the reserve of resilience makes it possible to maintain satisfactory clamping even when the dimensions of the object to be clamped change, in particular under the effect of temperature variations.

The improvement provided by patent application No. 93 06 046 relates to avoiding discontinuity in the pressure applied by the collar on the object to be clamped when the inner strip portion is rolled up through more than 360°, i.e. when its two ends overlap.

However, in certain difficult cases, the qualities of the collars described in the above-specified documents can be lost while the collar is being installed or is being clamped.

More precisely, it can happen that while the hook is being engaged on the lug, the collar is inadvertently clamped too tight, and even if only temporary that runs the risk of causing the elastic limit of the metal to be exceeded locally.

Nevertheless, it turns out to be important for the collar to retain its elasticity so as to be able to continue guaranteeing clamping on the object to be clamped even if the dimensions of the object change slightly after the collar has been installed.

The patent application filed on May 19, 1993 by the Applicant under the No. 93 06 045 proposes providing the lug with an abutment member suitable for coming into abutment contact with the inside face of the hook while the hook is being engaged on the lug.

Overall that solution has proved satisfactory in preventing the elastic limit being exceeded around the collar, and more particularly in the region of the hook.

Nevertheless, the requirements laid down by manufacturers are such that it is essential, even in the most difficult of cases, to ensure total effectiveness of the reserve of resilience by avoiding the elastic limit being exceeded at all, specifically in that region.

OBJECTS AND SUMMARY OF THE INVENTION

The present invention seeks to solve this technical problem and to further improve the above-specified collars.

To this end, the collar includes first and second abutment means formed respectively on the intermediate part of the outer portion and on the covered zone of the inner portion and suitable for co-operating with each other to set a limit on use of the reserve of resilience.

The reserve of resilience is usable, both in its expansion direction and its contraction direction, throughout the lifetime of the collar. Nevertheless, as soon as the first and second abutment means come into contact, expansion is stopped.

Naturally, the abutment means are implemented in such a manner as to come into contact before expansion has reached the threshold at which the elastic limit is exceeded. In other words, the limit up to which the reserve of resilience can be used lies below the threshold at which the elastic limit is exceeded.

This very simple disposition makes it possible to guarantee that the reserve of resilience is completely effective.

Having the first and second abutment means provided on two different portions of strip (the outer portion and the inner portion) is a condition necessary for them to be effective. When these means co-operate in abutment, the position of the hook is wedged relative to the second end of the inner portion of strip. As a result, the collar then behaves as though it comprised a single strip only and it can be tightened by reducing the diameter of this single strip only, which amounts to acting mainly on the inner strip portion.

Immediately after clamping, the reserve of resilience contracts so as to reduce the diameter of the collar, in such a direction as to move the abutment means apart so they cease to co-operate. Thereafter, it varies either in the expansion direction or else in the contraction direction, as a function of fluctuations in the diameter of the object to be clamped, e.g. due to variations in temperature.

It should be observed that the abutment means could not perform their function of limiting the stroke of the reserve of resilience if the second abutment means were at the same end of the inner strip portion as the lug and extending beyond the lug (instead of being in the vicinity of the other end of the inner strip portion, as it is in the invention).

Were the second abutment means to be at the lug end, then the start of co-operation between the abutment means would lock the dimensions of the part of the outer strip portion located between the first abutment means and the hook, and as a result said co-operation would lock the position of the hook relative to the lug. In that situation, if the diameter of the object to be clamped were sufficiently small, then the reserve of resilience would not be brought into play and the hook could be engaged on the lug providing the distance between the lug and the second abutment means were shorter than the distance between the end of the hook and the first abutment means.

In contrast, if the diameter of the object to be clamped were relatively large, then the reserve of resilience would inevitably be stressed without any limit being set and until the clamping diameter had been reached, thereby enabling the hook to be engaged on the lug.

Such a disposition of the first abutment means would therefore not make it possible in any way to define a limit on the amount the reserve of resilience can be stretched in use.

The first and second abutment means may be provided single or simultaneously with the abutment member that constitutes the subject matter of application No. 93 06 045.

BRIEF DESCRIPTION OF THE DRAWINGS

The invention will be well understood and its advantages will appear more clearly on reading the following detailed description of an embodiment given by way of non-limiting example. The description refers to the accompanying drawings, in which:

FIG. 4 is a fragmentary view in section showing a variant embodiment of the collar; and FIG. 5 is a plan view of the two ends of the inner strip portion of the collar of FIG. 4.

MORE DETAILED DESCRIPTION

Figure 1:
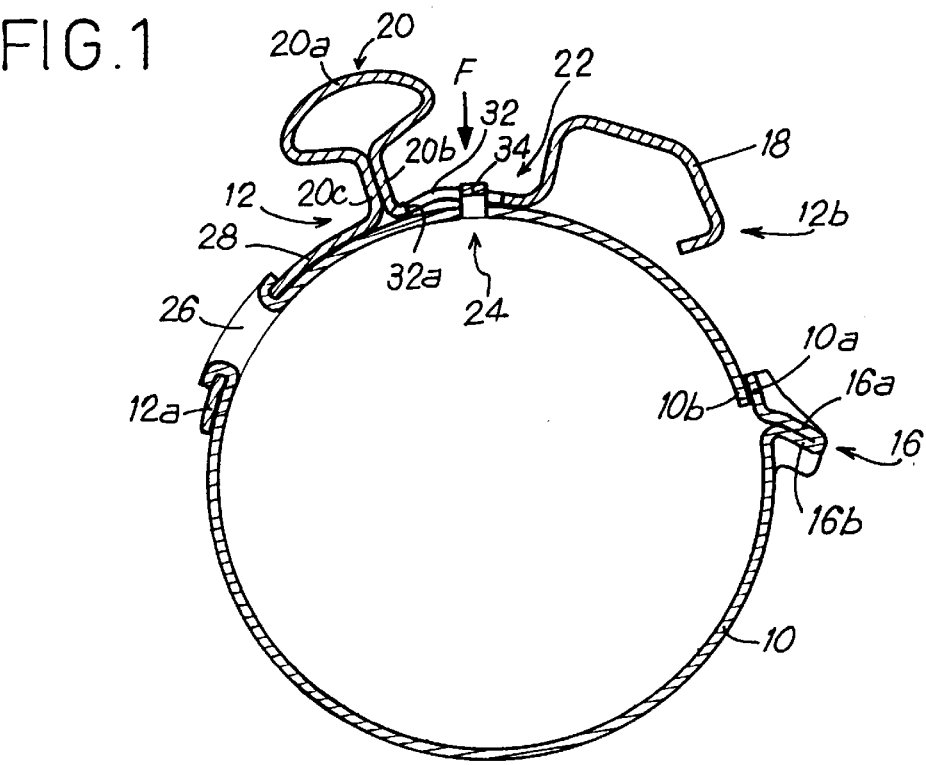
FIG. 1 is a section through a clamping collar of the invention before the hook has been engaged on the lug, and in a situation where the reserve of resilience is not in use.
Figure 3:
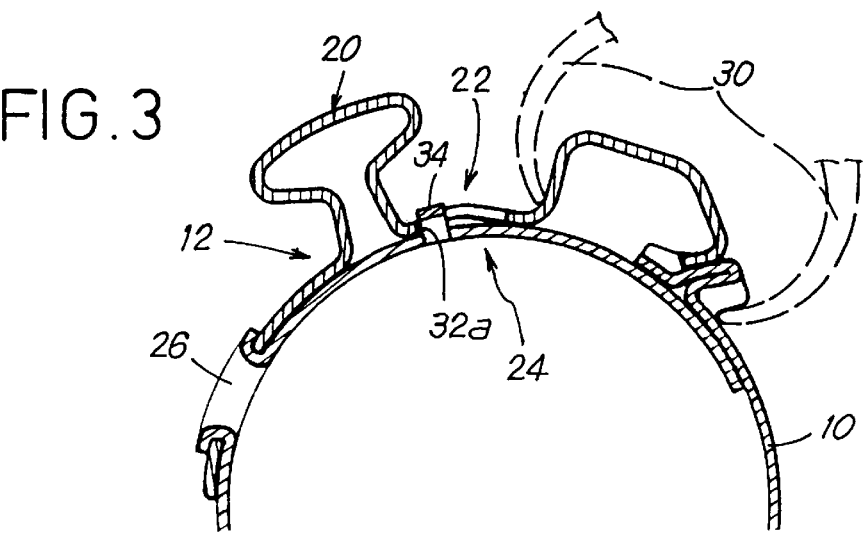
FIG. 3 shows a portion of the FIG. 1 collar while the hook is being engaged on the lug, and in a situation where the limit on use of the reserve of resilience has been reached.

The collar shown in FIGS. 1 and 3 is constituted by a rolled-up inner strip portion 10 and by an outer strip portion 12 which is fixed at a first of its ends 12a to the outside face of the inner portion 10. In the vicinity of one end 10a, the inner portion has two folds 16a and 16b to constitute a lug 16 projecting radially from its outside periphery. This inner portion 10 is rolled up through more than 360°, such that when the collar is in the unclamped state, its other end 10b lies beneath its said one end 10a, or even beneath the lug 16.

A second end 12b of the outer strip portion 12 is provided with a hook 18 suitable for being engaged on the lug 16 while the collar is being clamped. Going from its first end 12a towards the hook 18, this portion 12 comprises, in succession, an undulation 20 forming a reserve of resilience, and an intermediate part 22 which extends substantially along the periphery of the inner portion 10. The inner portion thus has a zone 24 which is covered by the intermediate part 22. This covered zone 24 is thus situated close to the said other end 10b of the inner strip 10. More precisely, this zone 24 is situated between the said other end 10b of the inner strip and the connection between the inner strip 10 and the first end 12a of the outer strip 12.

In the example shown, the outer strip portion 12 is fixed on the inner strip portion 10 by riveting, i.e. by the rim of a cylindrical piece 26 punched in the inner strip portion 10 being hammered down onto the outer portion 12. This method of fixing serves to avoid creating any projections on the inside periphery of the portion 10 which would otherwise run the risk of damaging the object clamped by the collar.

In this example, the undulation 20 is not immediately adjacent to the zone where the two strip portions forming the collar are fixed together, but is offset therefrom by a part 28 of the outer portion 12 extending along the periphery of the inner portion 10.

First and second abutment means are formed respectively on the intermediate part 22 of the outer portion and on the covered zone 24 of the inner portion.

Figure 2A:
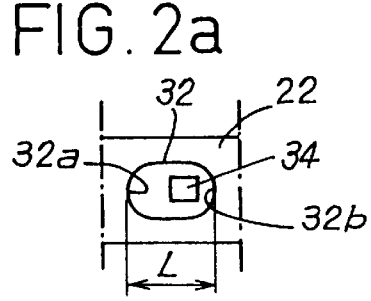
FIG. 2a is a fragmentary view seen along arrow F in FIG. 1.

In FIGS. 1, 2a, and 3, the intermediate part 22 has a window 32 and the covered zone 24 is provided with a radial projection 34 which projects outwardly through the window 32.

The first abutment means is then constituted by the end 32a of the window 32 that is closer to the undulation 20. The radial projection 34 constitutes the second abutment means.

In the long direction of the outer portion 12, the window 32 has a length L. Depending on the deformation of the reserve of resilience, the radial projection 34 moves inside the window between the abutment end 32a and, at most, the opposite end 32b. The length of the window thus determines the range over which it is possible to use the reserve of resilience.

Figure 2B:
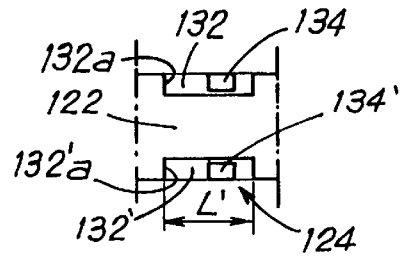
FIG. 2b is a view analogous to that of FIG. 2a, showing a variant embodiment of the abutment means.

In the variant of FIG. 2b, the intermediate part 122 has two lateral notches 132 and 132' disposed in side-by-side alignment. The covered zone 124 has two radial projections 134 and 134' likewise in side-by-side alignment and engaged in the notches 132 and 132'.

The first abutment means is then constituted by the ends 132a and 132'a of the notches that are closer to the undulation, whereas the second abutment means is constituted by the radial projections 134 and 134'.

Depending on the deformation of the undulation, the projections move within the notches whose length L' determines the range over which the reserve of resilience can be used.

It would also be possible to provide a single lateral notch and a single radial projection engaged therein.

The radial projections 34, 134, or 134' are constituted by stamped, punched, or similar tabs formed in the covered zone 24 or 124 of the inner portion.

FIG. 3 shows the collar of FIG. 1 while it is being engaged by a tool such as a pincer, shown in part by dashed lines. While this is taking place, it may be necessary to use up the reserve of resilience as shown in FIG. 3 where the undulation 20 is shown in its position of maximum expansion. This position corresponds to the limit to which the reserve of resilience can be used and is determined by co-operation between the first and second abutment means.

It will be observed in FIGS. 1 and 3 that the intermediate part 22 is slightly deformed in a radially outwards direction. The abutment end 32a is formed in a part of this deformation that is radially close to the periphery of the inner strip portion 10. This deformation makes it possible, even when the reserve of resilience has been used up, to keep the edge of the abutment 32a close to the inner strip portion 10 so as to ensure that the radial projection 34 does not escape therefrom.

A similar deformation may be provided in the variant shown in FIG. 2b.

The undulation 20 is implemented in the form of an Ω-loop 20a presenting two legs 20b and 20c which, in the relaxed state of the reserve of resilience, are adjacent to each other and extend substantially radially.

In FIGS. 4 and 5, elements analogous to those of FIG. 1 are given the same references plus 200. In FIG. 4, reference signs 212, 218, 220, 232 and 234 refer to elements that are the equivalent of the elements denoted by reference signs 12, 18, 20, 32 and 34 of FIG. 1.

In the variant shown in these figures, advantage is taken of the fact that the end 210b of the inner strip portion 210 extends beneath the end 210a of said strip portion when the collar is in the unclamped state, for the purpose of interconnecting these two ends. For this purpose, the end 210a provided with the lug 216 has a longitudinal slot 250 situated in-board of the lug, i.e. after the lug when going from the lug end 210a towards the other end 210b. The end 210b is provided with an outwardly-folded radial tip 260.

The radial tip 260 is connected to strip portion 210 by a thin neck 262 whose width is smaller than the width of the slot 250, thereby enabling it to be received therein. The thin neck extends mainly radially, but as shown in FIG. 5 it could also have a portion lying in the plane of the strip. The free end 264 of the radial tip 260 is wider than the neck 262.

In the example shown, the radial tip 260 and the slot 250 are in alignment. The slot includes a hole 252 of width at least as great as the width of the free end 264 of the radial tip 260, and a running part constituted by two lengths 254 and 256 of width smaller than that of the free end 264.

The radial tip 260 can thus be inserted in the slot 250 via the hole 252, but once it is in the running part of the slot, its enlarged free end prevents it from escaping. When the collar is in the non-clamped state, the resilience of the strip portion has the effect of causing the radial tip 260 naturally to occupy the vicinity of the end 254a of the length 254 that is closer to the lug 216, in which position it cannot escape from the slot.

The radial tip may be in the form of a T-shape or an upside-down L-shape.

The invention claimed is:

1. A clamping collar, comprising a first metal strip portion being rolled-up on itself over at least one turn, having first and second ends, and having two radial folds being adjacent to said first end forming a lug; a second metal strip portion, being disposed on an outside face of said first metal strip portion, having a first end affixed to said outside face of said first metal strip portion, having a second end providing a hook suitable for engaging behind said lug while said collar is being clamped, having an undulation forming a reserve of resilience, and having an intermediate part disposed between said undulation and said hook, said intermediate part of said second metal strip portion defining a covered zone on said outer face of said first metal strip portion; a first abutment means formed on said intermediate part of said second metal strip portion; and a second abutment means formed on said covered zone on said outer face of said first metal strip portion, whereby said first and second abutment means cooperate to set a limit on the expansion of the undulation forming said reserve of resilience during or after clamping of the collar wherein said reserve of resilience enables the clamping collar to expand or contract with a work piece.

2. A collar as claimed in claim 1, wherein said first metal strip includes a longitudinal slot, said slot disposed behind said lug of said first metal strip portion in a direction turning from said first end to said second end of said first metal strip portion, and wherein said second end of said first metal strip portion having an outwardly directed radial tip, said tip being adapted to be engaged in said slot, said tip having a neck and a free end, said neck having a width narrower than a width of said free end, said slot having a hole having a width at least as great as said width of said free end and a running part, having a width smaller than said width of said free end and at least as great as said width of said neck.

3. A collar as claimed in claim 1, wherein said first abutment means further includes a window formed in said intermediate part of said second metal strip portion, said window having first and second ends, said first end of said window being closer to said undulation than said second end of said window, and wherein said second abutment means comprises an outwardly extending radial projection provided on said first metal strip portion, said projection being retained in said window and being suitable for cooperating in abutment with said first end of said window.

4. A collar as claimed in claim 3, wherein said first metal strip portion includes a longitudinal slot, said slot disposed behind said lug of said first metal strip portion in a direction turning from said first end to said second end of said first metal strip portion, and wherein said second end of said first metal strip portion having an outwardly directed radial tip, said tip being adapted to be engaged in said slot, said tip having a neck and a free end, said neck having a width narrower than a width of said free end, said slot having a hole having a width at least as great as said width of said free end and a running part, having a width smaller than said width of said free end and at least as great as said width of said neck.

5. A collar as claimed in claim 3, wherein said outwardly extending radial projection is comprised of a tab stamped out from said covered zone on said outer face of said first metal strip portion.

6. A collar as claimed in claim 5, wherein said first metal strip portion having a longitudinal slot, said slot disposed behind said lug of said first metal strip portion in a direction turning from said first end to said second end of said first metal strip portion, and wherein said second end of said first metal strip portion having an outwardly directed radial tip, said tip being adapted to be engaged in said slot, said tip having a neck and a free end, said neck having a width narrower than a width of said free end, said slot having a hole having a width at least as great as said width of said free end and a running part, having a width smaller than said width of said free end and at least as great as said width of said neck.

7. A collar as claimed in claim 1, wherein said first abutment means includes at least one lateral notch, formed in said intermediate part of said second metal strip portion, said notch having first and second ends, said first end of said notch being closer to said undulation than said second end of said notch, and wherein said second abutment means comprises at least one outwardly extending radial projection provided on said first metal strip portion, said projection being retained in said notch and being suitable for cooperating in abutment with said first end of said notch.

8. A collar as claimed in claim 7, wherein said at least one outwardly extending radial projection is comprised of a tab stamped out from said covered zone on said outer face of said first metal strip portion.

9. A collar as claimed in claim 8, wherein said first metal strip portion includes a longitudinal slot, said slot disposed behind said lug of said first metal strip portion in a direction turning from said first end to said second end of said first metal strip portion, and wherein said second end of said first metal strip portion having an outwardly directed radial tip, said tip adapted to be engaged in said slot, said tip having a neck and a free end, said neck having a width narrower than a width of said slot and narrower than a width of said free end.

10. A collar as claimed in claim 7, wherein said first metal strip portion includes a longitudinal slot, said slot disposed behind said lug of said first metal strip portion in a direction turning from said first end to said second end of said first metal strip portion, and wherein said second end of said first metal strip portion having an outwardly directed radial tip, said tip adapted to be engaged in said slot, said tip having a neck and a free end, said neck having a width narrower than a width of said slot and narrower than a width of said free end.

11. A clamping collar for clamping an article whose configuration will fluctuate with a change in temperature, comprising a first metal strip portion being rolled-up on itself over at least one turn, having first and second ends, and having two radial folds being adjacent to said first end forming a lug; a second metal strip portion, being disposed on an outside face of said first metal strip portion, having a first end affixed to said outside face of said first metal strip portion, having a second end providing a hook suitable for engaging behind said lug while said collar is being clamped, having an undulation forming a reserve of resilience, and having an intermediate part disposed between said undulation and said hook, said intermediate part of said second metal strip portion defining a covered zone on said outer face of said first metal strip portion; a first abutment means formed on said intermediate part of said second metal strip portion; and a second abutment means formed on said covered zone on said outer face of said first metal strip portion, whereby said first and second abutment means cooperate to set a limit on the expansion of the undulation forming said reserve of resilience during or after clamping of the collar wherein said reserve of resilience enables the clamping collar to expand or contract with a work piece.

12. A collar as claimed in claim 11, wherein said first metal strip includes a longitudinal slot, said slot disposed behind said lug of said first metal strip portion in a direction turning from said first end to said second end of said first metal strip portion, and wherein said second end of said first metal strip portion having an outwardly directed radial tip, said tip being adapted to be engaged in said slot, said tip having a neck and a free end, said neck having a width narrower than a width of said free end, said slot having a hole having a width at least as great as said width of said free end and a running part, having a width smaller than said width of said free end and at least as great as said width of said neck.

13. A collar is claimed in claim 11 wherein said first abutment means further includes a window formed in said intermediate part of said second metal strip portion, said window having first and second ends, said first end of said window being closer to said undulation than said second end of said window, and wherein said second abutment means comprises an outwardly extending radial projection provided on said first metal strip portion, said projection being retained in said window and being suitable for cooperating in abutment with said first end of said window.

14. A collar as claimed in claim 13, wherein said first metal strip portion includes a longitudinal slot, said slot disposed behind said lug of said first metal strip portion in a direction turning from said first end to said second end of said first metal strip portion, and wherein said second end of said first metal strip portion having an outwardly directed radial tip, said tip being adapted to be engaged in said slot, said tip having a neck and a free end, said neck having a width narrower than a width of said free end, said slot having a hole having a width at least as great as said width of said free end and a running part, having a width smaller than said width of said free end and at least as great as said width of said neck.

15. A collar as claimed in claim 13, wherein said outwardly extending radial projection is comprised of a tab stamped out from said covered zone on said outer face of said first metal strip portion.

16. A collar as claimed in claim 15, wherein said first metal strip portion having a longitudinal slot, said slot disposed behind said lug of said first metal strip portion in a direction turning from said first end to said second end of said first metal strip portion, and wherein said second end of said first metal strip portion having an outwardly directed radial tip, said tip being adapted to be engaged in said slot, said tip having a neck and a free end, said neck having a width narrower than a width of said free end, said slot having a hole having a width at least as great as said width of said free end and a running part, having a width smaller than said width of said free end and at least as great as said width of said neck.

* * * * *